(12) United States Patent
Ikeda et al.

(10) Patent No.: US 10,857,859 B2
(45) Date of Patent: Dec. 8, 2020

(54) VEHICLE PILLAR STRUCTURE AND VEHICLE SIDE PORTION STRUCTURE

(71) Applicant: TOYOTA JIDOSHA KABUSHIKI KAISHA, Toyota (JP)

(72) Inventors: Koki Ikeda, Toyota (JP); Motoya Sakabe, Nisshin (JP); Takuya Miura, Toyota (JP); Kazuki Furukawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/237,773

(22) Filed: Jan. 2, 2019

(65) Prior Publication Data

US 2019/0217899 A1 Jul. 18, 2019

(30) Foreign Application Priority Data

Jan. 16, 2018 (JP) .................................. 2018-005153

(51) Int. Cl.
| | |
|---|---|
| *B62D 25/04* | (2006.01) |
| *B60J 5/04* | (2006.01) |
| *B62D 25/02* | (2006.01) |

(52) U.S. Cl.
CPC ............ *B60J 5/0422* (2013.01); *B62D 25/02* (2013.01); *B62D 25/04* (2013.01)

(58) Field of Classification Search
CPC ... B62D 25/04; B60J 1/06; B60J 5/042; B60J 5/044; B60J 5/0422; B60J 5/0423; B60J 5/0426

USPC ............ 296/193.06, 203.01–203.03, 187.09, 296/187.1, 96.18, 146.6
See application file for complete search history.

(56) References Cited

U.S. PATENT DOCUMENTS

2007/0216189 A1* 9/2007 Matsumoto ............ B62D 25/04
296/96.21
2011/0248525 A1 10/2011 Lundstroem

FOREIGN PATENT DOCUMENTS

| DE | 10 2014 203 215 A1 | 8/2014 | |
|---|---|---|---|
| EP | 2371678 A1 * | 10/2011 | ............ B62D 25/04 |
| FR | 774173 A | 11/1934 | |
| JP | 63-142276 U | 9/1988 | |
| JP | 2013-112077 | 6/2013 | |
| KR | 101123514 B1 * | 3/2012 | |

* cited by examiner

*Primary Examiner* — Dennis H Pedder
(74) *Attorney, Agent, or Firm* — Oblon, McClelland, Maier & Neustadt, L.L.P.

(57) ABSTRACT

A vehicle pillar structure includes a plurality of pillar frame structure portions, a transparent member, and a connection member. The pillar frame structure portions are disposed on an edge side of an upper half of a door opening as a portion of a columnar pillar. The pillar frame structure portions are provided in parallel with an interval, and have upper and lower end portions fixed to a frame member of the vehicle side portion. The transparent member is formed of a transparent material and is bridged between the pillar frame structure portions. The connection member is formed separately from the pillar frame structure portions, the frame member, and the transparent member, and connects the pillar frame structure portions.

8 Claims, 5 Drawing Sheets

VEHICLE PILLAR STRUCTURE AND VEHICLE SIDE PORTION STRUCTURE

INCORPORATION BY REFERENCE

The disclosure of Japanese Patent Application No. 2018-005153 filed on Jan. 16, 2018 including the specification, drawings and abstract is incorporated herein by reference in its entirety.

BACKGROUND

1. Technical Field

The disclosure relates to a vehicle pillar structure and a vehicle side portion structure.

2. Description of Related Art

In a vehicle pillar, a structure is known in which a window portion is provided to secure the visibility of an occupant (see Japanese Unexamined Patent Application Publication No. 2013-112077 (JP 2013-112077 A) and Japanese Unexamined Utility Model Application Publication No. 63-142276 (JP 63-142276 U)). For example, JP 2013-112077 A discloses a technique in which a window frame is formed in an upper half of a front pillar and a corner window is provided in the window frame. Briefly, in this related art, a longitudinal side portion (long side portion) of a vehicle body front side of the window frame is formed as a front pillar upper portion, and a longitudinal side portion (long side portion) of a vehicle body rear side of the window frame is formed as a sub-pillar. An upper end portion of the front pillar upper portion and an upper end portion of the sub-pillar are joined to a rail front portion of a roof side rail, and a lower end portion of the front pillar upper portion and a lower end portion of the sub-pillar are joined to a front pillar lower portion. With such a configuration, the occupant can see the outside of the vehicle through the corner window.

SUMMARY

However, in the case of the related art, the front pillar upper portion and the sub-pillar are thinner than an upper half of a front pillar in a case where a window frame is not provided, for example. Therefore, there is concern of a reduction in the rigidity of a pillar, which may lead to a reduction in the rigidity of the vehicle body.

The disclosure provides a vehicle pillar structure and a vehicle side portion structure capable of securing the rigidity of a pillar even when a pillar frame structure portion forming a long side portion of a window portion of the pillar is reduced in thickness.

A vehicle pillar structure according to a first aspect of the disclosure, includes: a plurality of pillar frame structure portions, the pillar frame structure portions being disposed on an edge side of an upper half of a door opening as a portion of a columnar pillar in a vehicle side portion, being provided in parallel with an interval between the pillar frame constituent portions in a direction perpendicular to a longitudinal direction of the pillar as viewed from an inside of a vehicle cabin, being configured as separate members, being formed in a hollow columnar shape, and having upper and lower end portions fixed to a frame member of the vehicle side portion; a transparent member that is formed of a transparent material and is bridged between the pillar frame structure portions that are adjacent to each other; and a connection member that is formed separately from members constituting the pillar frame structure portions, the frame member, and the transparent member, and connects the pillar frame structure portions that are adjacent to each other.

With the configuration, the plurality of pillar frame structure portions is disposed on the edge side of the upper half of the door opening as a portion of the columnar pillar in the vehicle side portion, and are provided in parallel with an interval therebetween in the direction perpendicular to the longitudinal direction of the pillar as viewed from the inside of the vehicle cabin. The plurality of pillar frame structure portions is formed as separate members and thus are more easily made compared to a comparable structure in which the plurality of pillar frame structure portions is formed of the same member. In addition, since the transparent member is bridged between the pillar frame structure portions that are adjacent to each other, an occupant inside the vehicle cabin can see the outside of the vehicle from between the pillar frame structure portions. In addition, since each of the plurality of pillar frame structure portions is formed in a hollow columnar shape and has a closed cross-sectional structure as viewed in the longitudinal direction, a certain degree of rigidity is secured for each of the pillar frame structure portions. Here, the pillar frame structure portions that are adjacent to each other, are connected by the connection member that is formed separately from the members constituting the pillar frame structure portions, the frame member of the vehicle side portion, and the transparent member. Accordingly, when an external load is applied to the pillar, relative movement between the plurality of pillar frame structure portions is suppressed.

In the first aspect, the connection member may include a lower connection member that connects lower portions of the pillar frame structure portions that are adjacent to each other, and an upper connection member that connects upper portions of the pillar frame structure portions that are adjacent to each other, and a frame-like structure part may be formed by the lower connection member, the upper connection member, and the pillar frame structure portions.

With the configuration, the lower portions of the pillar frame structure portions that are adjacent to each other, are connected by the lower connection member, and the upper portions of the pillar frame structure portions that are adjacent to each other, are connected by the upper connection member. In addition, since the frame-like structure part is formed by the lower connection member, the upper connection member, and the pillar frame structure portions, when an external load is applied to the pillar, relative movement between the pillar frame structure portions is effectively suppressed.

In the above aspect, the connection member may be disposed at a position overlapping the frame member as viewed from the inside of the vehicle cabin.

With the configuration, it is possible to secure visibility equivalent to visibility from the inside of the vehicle cabin in a case where no connection member is provided.

A vehicle side portion structure according to a second aspect of the disclosure, includes: a front pillar to which the vehicle pillar structure according to the first aspect of the disclosure is applied; a front side door that opens and closes a front door opening as the door opening having the front pillar disposed on the front edge side of the door opening; and a beltline reinforcement that is provided in the front side door and is disposed along a beltline, in which the connection member has a lower connection member that connects lower portions of the pillar frame structure portions that are adjacent to each other, and the lower connection member includes a load transmission portion that is located on a vehicle front side of the beltline reinforcement in a state in which the front side door is closed and is configured to transmit a load from the vehicle front side to a front end portion side of the beltline reinforcement.

With the configuration, since the lower connection member connects the lower portions of the pillar frame structure portions that are adjacent to each other, a portion of the load from the vehicle front side at the time of a frontal collision is transmitted from the pillar frame structure portion on the vehicle front side to the pillar frame structure portion on a vehicle rear side via the lower connection member. In addition, the load transmission portion of the lower connection member is located on the vehicle front side of the beltline reinforcement in the state in which the front side door is closed, and a portion of the load from the vehicle front side at the time of a frontal collision is transmitted from the load transmission portion of the lower connection member to the front end portion side of the beltline reinforcement. Accordingly, it is possible to improve collision safety performance at the time of a frontal collusion.

In the second aspect, a first ridgeline extending along a vehicle front-rear direction in the state in which the front side door is closed may be formed in the beltline reinforcement, and a second ridgeline extending along the vehicle front-rear direction may be formed in the load transmission portion, and a rear end portion of the second ridgeline may be set at a position where a load from the vehicle front side in the state in which the front side door is closed is transmitted to a front end portion side of the first ridgeline.

With the configuration, the first ridgeline of the beltline reinforcement extends along the vehicle front-rear direction in the state in which the front side door is closed, and the second ridgeline formed in the load transmission portion of the lower connection member also extends along the vehicle front-rear direction. Here, the rear end portion of the second ridgeline is set at the position where the load from the vehicle front side in the state in which the front side door is closed is transmitted to the front end portion side of the first ridgeline. Therefore, a portion of the load applied to the lower connection member from the vehicle front side at the time of a frontal collision is transmitted along the second ridgeline of the load transmission portion and is thereafter efficiently transmitted along the first ridgeline of the beltline reinforcement.

As described above, with the vehicle pillar structure and the vehicle side portion structure of the aspects of the disclosure, an excellent effect of securing the rigidity of the pillar can be achieved even when the pillar frame structure portion forming the long side portion of the window portion of the pillar is reduced in thickness.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
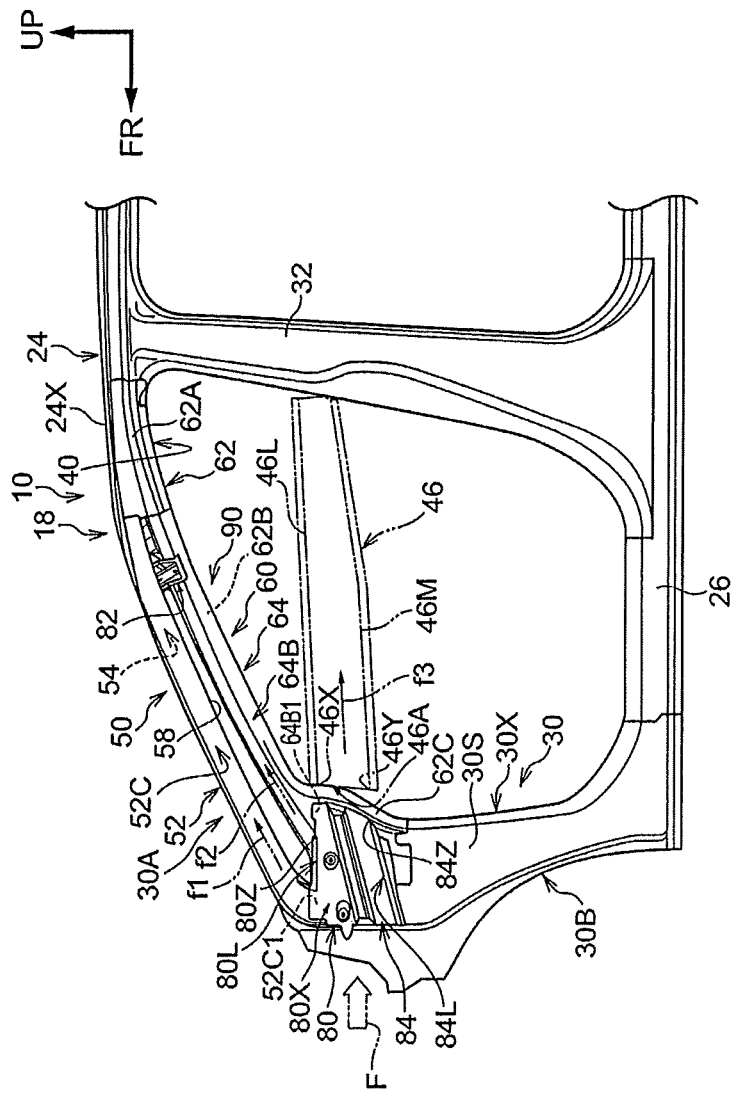
FIG. 1 is a side view illustrating a portion of a vehicle side portion to which a vehicle side portion structure having a vehicle pillar structure according to an embodiment of the disclosure is applied, in a state of being viewed from inside in a vehicle-width direction.

A vehicle side portion structure having a vehicle pillar structure according to an embodiment of the disclosure will be described with reference to FIGS. 1 to 5. An arrow FR, an arrow UP, and an arrow RH appropriately illustrated in the drawings respectively indicate a vehicle front side, a vehicle upper side, and a vehicle right side.

Configuration of Embodiment

Figure 2:
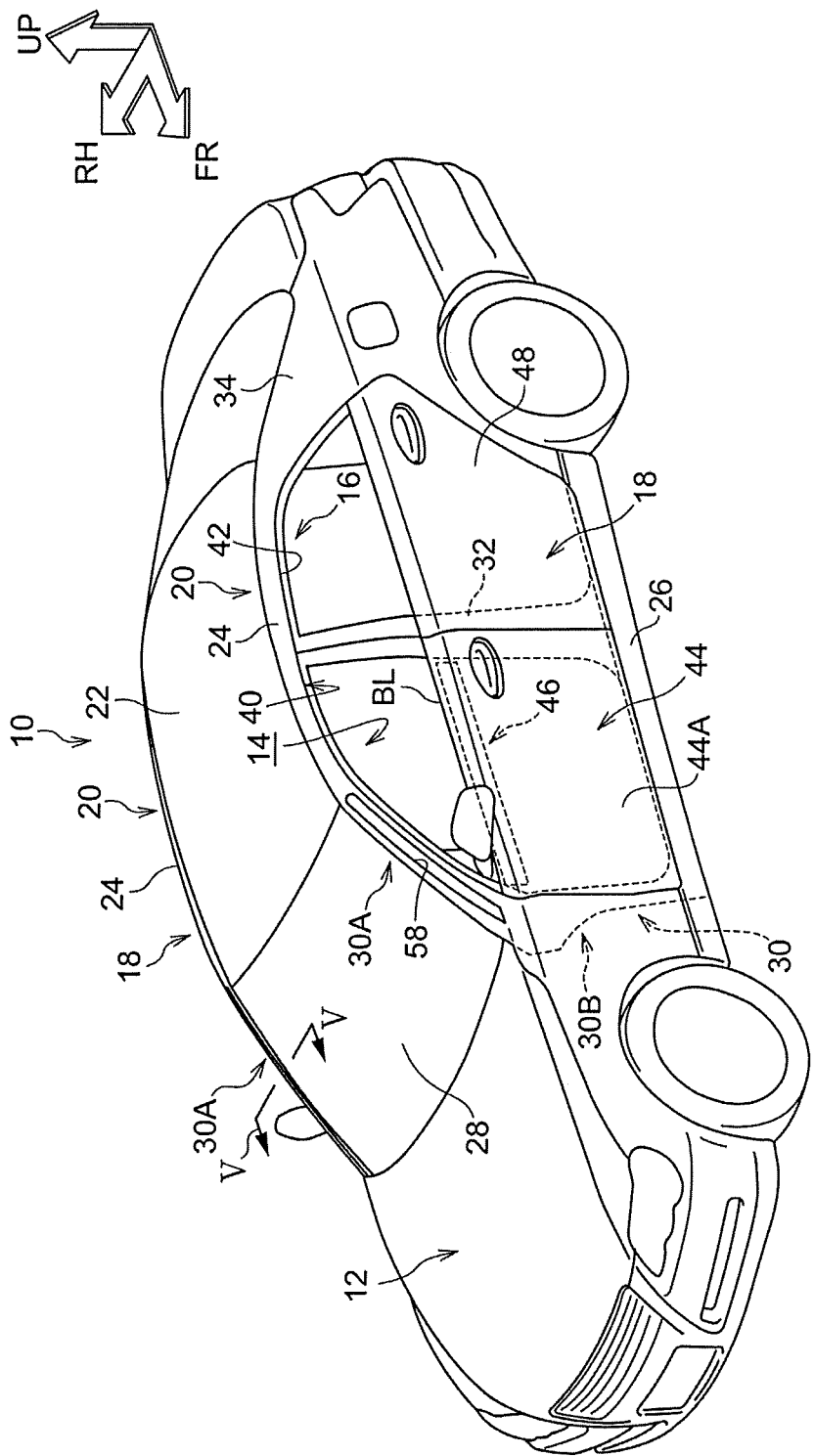
FIG. 2 is a perspective view of an outer appearance of a vehicle to which the vehicle side portion structure in FIG. 1 is applied.

FIG. 2 illustrates a perspective view of an outer appearance of a vehicle 10 to which the vehicle side portion structure having a vehicle pillar structure according to this embodiment is applied. As illustrated in FIG. 2, the vehicle 10 is configured to include a vehicle front portion 12 in which a power unit or the like (not illustrated) is accommodated, and a cabin 14 disposed on a vehicle rear side of the vehicle front portion 12. The vehicle front portion 12 and the cabin 14 are partitioned by a dash panel (not illustrated).

In a vehicle upper portion 16, a roof panel 22 forming a roof above the cabin 14 is disposed. In addition, a pair of right and left roof side rails 24 having a hollow closed cross-sectional structure are respectively disposed on both sides of the roof panel 22 in a vehicle-width direction (that is, at roof sides 20). The roof side rails 24 extend along a vehicle front-rear direction in an upper portion of a vehicle side portion 18. A front roof header (not illustrated) is bridged between front end portions of the pair of roof side rails 24 in the vehicle-width direction at the back side of a front end portion of the roof panel 22. In addition, a rear roof header (not illustrated) is bridged between rear end portions of the pair of roof side rails 24 in the vehicle-width direction at the back side of a rear end portion of the roof panel 22.

A locker 26 having a hollow closed cross-sectional structure is disposed in a lower portion of the vehicle side portion 18. The locker 26 extends along the vehicle front-rear direction. A front pillar 30 as a columnar pillar extends toward the vehicle upper side from a front end portion of the locker 26, and an upper end portion of the front pillar 30 is connected to the front end portion of the roof side rail 24. The front pillars 30 are disposed on both sides of the dash panel (not illustrated) in the vehicle-width direction. A pillar upper portion 30A forming an upper portion of the front pillar 30 is inclined toward the vehicle rear side as moving toward the vehicle upper side. A windshield 28 is mounted between a pair of the pillar upper portions 30A. A pillar lower portion 30B forming a lower portion of the front pillar 30 extends substantially vertically from a lower end portion of the pillar upper portion 30A toward the vehicle lower side.

A columnar center pillar 32 extends toward the vehicle upper side from an intermediate portion in a longitudinal direction of the locker 26. An upper end portion of the center pillar 32 is connected to an intermediate portion in a longitudinal direction of the roof side rail 24. A columnar rear pillar 34 extends toward the vehicle upper side on the vehicle rear side of the center pillar 32. An upper end portion of the rear pillar 34 is connected to the rear end portion of the roof side rail 24.

The roof side rails 24, the lockers 26, the front pillars 30, the center pillars 32, and the rear pillars 34 all constitute a vehicle body frame member. On a front side of the vehicle side portion 18, a front door opening 40 as a door opening surrounded by the roof side rail 24, the front pillar 30, the locker 26, and the center pillar 32 is formed. In addition, on a rear side of the vehicle side portion 18, a rear door opening 42 as a door opening surrounded by the vehicle body frame member including the roof side rail 24, the center pillar 32, the locker 26, and the rear pillar 34 is formed.

In other words, the roof side rail 24 is disposed along the vehicle front-rear direction on an upper edge side of the front door opening 40 and an upper edge side of the rear door opening 42, and the locker 26 is disposed along the vehicle front-rear direction on a lower edge side of the front door opening 40 and a lower edge side of the rear door opening 42. The front pillar 30 is disposed along a substantially vehicle up-down direction on a front edge side of the front door opening 40, and the center pillar 32 is disposed along a substantially vehicle up-down direction on a rear edge side of the front door opening 40 and a front edge side of the rear door opening 42. Furthermore, the rear pillar 34 is disposed along a substantially vehicle up-down direction on a rear edge side of the rear door opening 42.

The front door opening 40 and the rear door opening 42 cause the outside of the vehicle cabin and the inside of the vehicle cabin to communicate with each other. The front door opening 40 is opened and closed by a front side door 44. The rear door opening 42 is opened and closed by a rear side door 48.

The front side door 44 includes a door inner panel (not illustrated) disposed inside the vehicle cabin, and a door outer panel 44A that is disposed outside the vehicle cabin of the door inner panel and forms a door main body portion with the door inner panel. In the front side door 44, a beltline reinforcement 46 (hereinafter, abbreviated to "beltline RF 46") disposed along a beltline BL to have the vehicle front-rear direction as its longitudinal direction is provided. As an example, the beltline RF 46 has a cross-sectional shape perpendicular to the longitudinal direction formed in a hat shape over the entire length in the longitudinal direction such that the opening of the hat shape faces inward in the vehicle-width direction. In the beltline RF 46, an upper ridgeline 46L and a lower ridgeline 46M (see FIG. 1 for both) as a first ridgeline extending along the vehicle front-rear direction in a state in which the front side door 44 is closed are formed.

Next, the pillar upper portion 30A and its surrounding structure will be described in detail. FIG. 1 illustrates a side view of a portion of the vehicle side portion 18 to which the vehicle side portion structure having a vehicle pillar structure according to this embodiment is applied, as viewed from the inside of the vehicle in the vehicle-width direction. In FIG. 1, the arrangement position of the beltline RF 46 in the state in which the front side door 44 (see FIG. 2) is closed is indicated by a two-dot chain line.

The pillar upper portion 30A disposed on a front edge side of an upper half of the front door opening 40 includes a first frame structure portion 50 and a second frame structure portion 60 as pillar frame structure portions. The first frame structure portion 50 and the second frame structure portion 60 are formed as separate members and are formed into a hollow columnar shape (described later in detail). The first frame structure portion 50 and the second frame structure portion 60 are provided in parallel with an interval therebetween in a direction perpendicular to a longitudinal direction of the pillar upper portion 30A (the upper portion of the front pillar 30) as viewed from the inside of the vehicle cabin. The first frame structure portion 50 extends along a side edge portion of the windshield 28 (see FIG. 2), and the second frame structure portion 60 is provided on the vehicle rear side of the first frame structure portion 50 and outside of the first frame structure portion 50 in the vehicle-width direction and extends along a longitudinal direction of the first frame structure portion 50.

A lower end portion of the first frame structure portion 50 and a lower end portion of the second frame structure portion 60 are fixed to an upper portion of an outer panel 30X of the pillar lower portion 30B as a frame member of the vehicle side portion 18. The outer panel 30X of the pillar lower portion 30B forms a portion of the pillar lower portion 30B outside the vehicle cabin, and includes a side wall portion 30S extending along the vehicle up-down direction and the vehicle front-rear direction. Front flange portions of the outer panel 30X of the pillar lower portion 30B and an inner panel (not illustrated) forming a portion of the pillar lower portion 30B inside the vehicle cabin are joined together and rear flange portions of the outer panel 30X and the inner panel (not illustrated) forming a portion of the pillar lower portion 30B inside the vehicle cabin are joined together, so as to form a closed cross-section extending substantially along the vehicle up-down direction.

In addition, an upper end portion of the first frame structure portion 50 and an upper end portion of the second frame structure portion 60 are fixed to an outer panel 24X of the roof side rail 24 as a frame member of the vehicle side portion 18. The outer panel 24X of the roof side rail 24 forms an outer portion of the roof side rail 24 in the vehicle-width direction. Upper flange portions of the outer panel 24X of the roof side rail 24 and an inner panel (not illustrated) forming an inner portion of the roof side rail 24 in the vehicle-width direction are joined together and lower flange portions of the outer panel 24X and the inner panel (not illustrated) forming an inner portion of the roof side rail 24 in the vehicle-width direction are joined together, so as to form a closed cross-section extending substantially along the vehicle front-rear direction.

The first frame structure portion 50 and the second frame structure portion 60 are fixed to the outer panel 30X of the pillar lower portion 30B and the outer panel 24X of the roof side rail 24 so as to form a window portion 58 extending along the longitudinal direction of the pillar upper portion 30A.

The first frame structure portion 50 is formed by a first outer reinforcement 52 (hereinafter, abbreviated to "first outer RF 52") and a first inner reinforcement 54 (hereinafter, abbreviated to "first inner RF 54") illustrated in FIG. 3. The second frame structure portion 60 (see FIG. 1) is formed by a second outer reinforcement 62 (hereinafter, abbreviated to "second outer RF 62") and a second inner reinforcement 64 (hereinafter, abbreviated to "second inner RF 64"). The first outer RF 52, the first inner RF 54, the second outer RF 62, and the second inner RF 64 are formed by pressing a steel plate (more specifically, a high tension steel plate) as an example.

Figure 5:
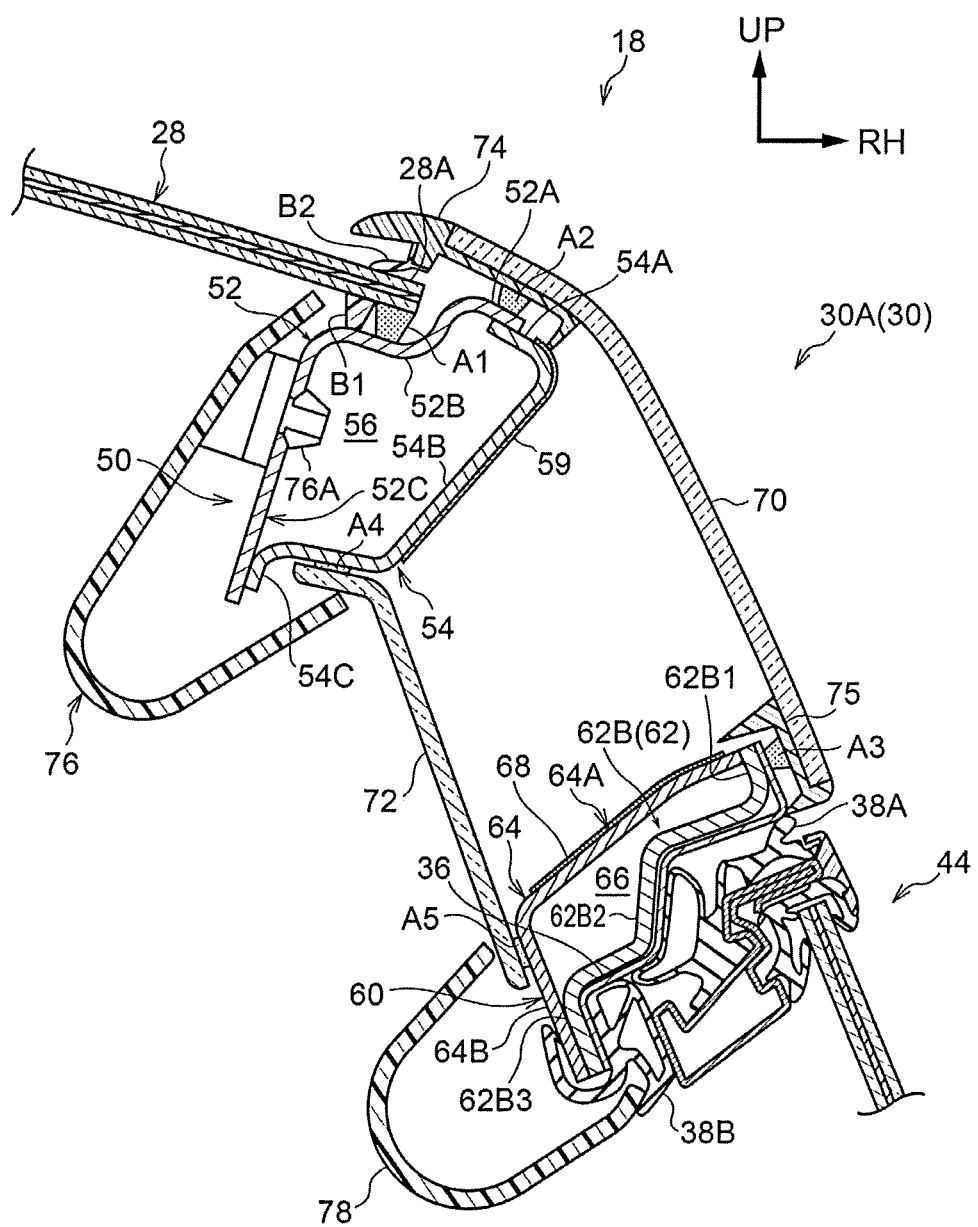
FIG. 5 is an enlarged cross-sectional view of a state taken along the line V-V in FIG. 2.

FIG. 5 illustrates an enlarged cross-sectional view of a state taken along the line V-V in FIG. 2. As illustrated in FIGS. 3 and 5, the first outer RF 52 is formed in an open cross-sectional shape that is open to a vehicle lower rear side and the outside in the vehicle-width direction as a whole. As illustrated in FIG. 5, the first outer RF 52 includes a front wall 52A that forms a front side of the first outer RF 52 in an outer portion of the first outer RF 52 in the vehicle-width direction. In addition, the first outer RF 52 includes, in an inner portion of the first outer RF 52 in the vehicle-width direction, an inner wall 52C extending slightly obliquely inward in the vehicle-width direction toward the vehicle lower side in the cross-section illustrated in FIG. 5. As illustrated in FIG. 1, the inner wall 52C is in a state of being slightly twisted by being gradually changed in its plane direction toward a vehicle lower front side and is disposed to be directed substantially along the vehicle up-down direction and the vehicle front-rear direction at a lower end portion 52C1. Furthermore, as illustrated in FIG. 3, the first outer RF 52 includes, in an outer portion of an upper end side of the first outer RF 52 in the vehicle-width direction, an upper outer flange portion 52F extending toward the vehicle lower rear side.

As illustrated in FIG. 5, the first outer RF 52 includes an intermediate wall portion 52B that connects an inner end portion of the front wall 52A in the vehicle-width direction to an end portion of the inner wall 52C on a vehicle upper front side. The intermediate wall portion 52B is formed in a substantially V-shape protruding toward the vehicle lower rear side. A side edge portion 28A of the windshield 28 is joined to an inner portion of the intermediate wall portion 52B in the vehicle-width direction via an adhesive layer A1. In addition, a cushion rubber B1 is attached to a portion of the windshield 28 on the inner side in the vehicle-width direction than the adhesive layer A1.

Figure 3:
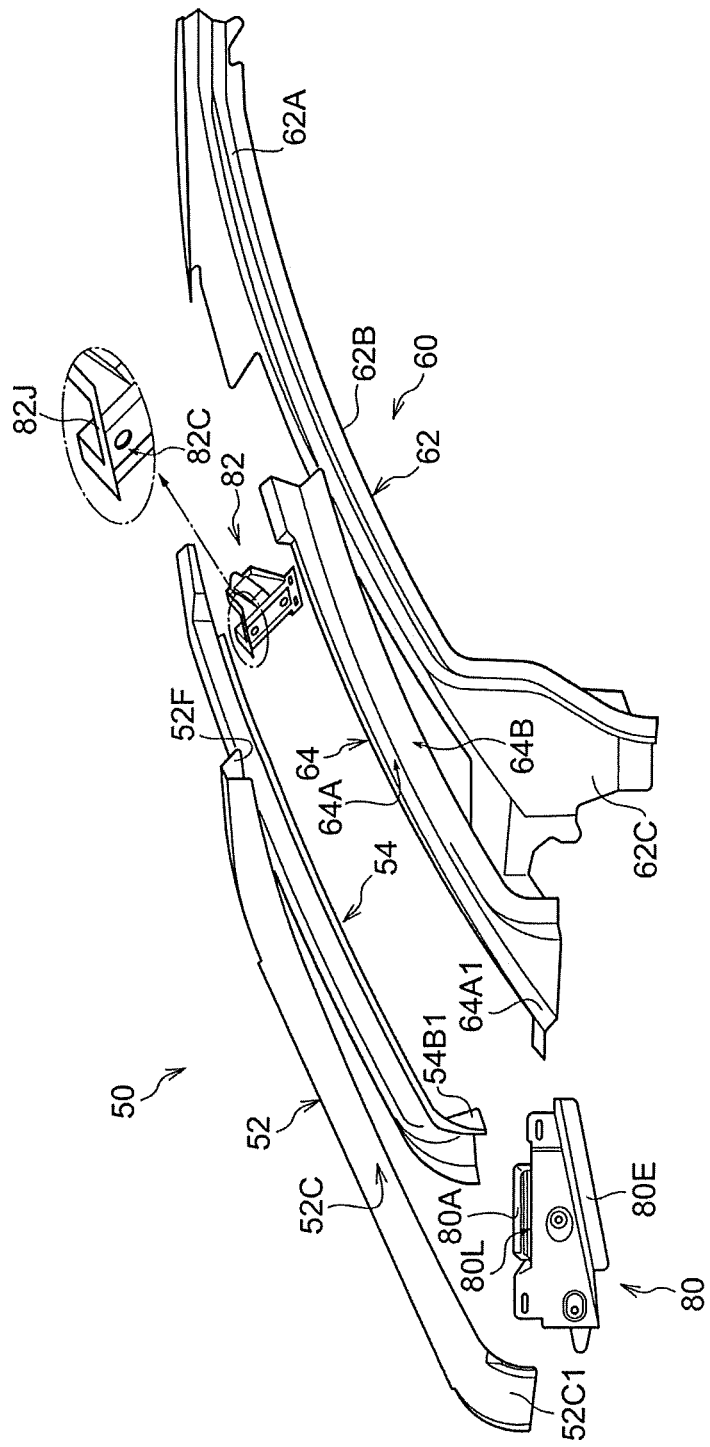
FIG. 3 is an exploded perspective view illustrating main parts of an upper side of a front pillar in FIG. 1.

As illustrated in FIGS. 3 and 5, the first inner RF 54 is formed in an open cross-sectional shape that is open to the vehicle upper front side and the inside in the vehicle-width direction as a whole. As illustrated in FIG. 5, the first inner RF 54 includes a front wall 54A that forms a front side of the first inner RF 54. An inner end portion of the front wall 54A in the vehicle-width direction overlaps and is joined to a portion of the front wall 52A of the first outer RF 52 from the vehicle lower rear side. In addition, the first inner RF 54 includes, in an inner portion of the first inner RF 54 in the vehicle-width direction, an inner flange 54C that overlaps and is joined to a distal end portion of the inner wall 52C of the first outer RF 52 from the outside in the vehicle-width direction. Furthermore, the first inner RF 54 includes an intermediate wall portion 54B that connects an outer end portion of the front wall 54A in the vehicle-width direction to an end portion of the inner flange 54C on the vehicle upper front side, and the intermediate wall portion 54B is formed in a substantially V-shape protruding toward the vehicle lower rear side.

In the first outer RF 52 and the first inner RF 54, the front wall 52A and the front wall 52A are joined to each other and the inner wall 52C and the inner flange 54C are joined to each other so as to form a closed cross-section 56 as viewed in a longitudinal direction of the first frame structure portion 50. An interior film 59 is attached to a cross-sectional outer side of the closed cross-section 56 in a range from an outer portion of the intermediate wall portion 54B in the vehicle-width direction to an outer portion of the front wall 54A in the vehicle-width direction.

As illustrated in FIGS. 1 and 3, the second outer RF 62 includes a second frame outer portion 62B that forms a portion of the second frame structure portion 60. As illustrated in FIG. 5, the second frame outer portion 62B is formed in a curved plate shape bent in a triangular wave shape as an example in a longitudinal cross-sectional view. The second frame outer portion 62B includes, in an outer portion of the second frame outer portion 62B in the vehicle-width direction, a front wall 62B1 that forms a front end side of the second frame outer portion 62B. The second frame outer portion 62B includes, in an inner portion of the second frame outer portion 62B in the vehicle-width direction, an inner wall 62B3 extending toward the vehicle lower rear side obliquely slightly outward in the vehicle-width direction. Furthermore, the second frame outer portion 62B includes an intermediate wall portion 62B2 that connects an end portion of the front wall 62B1 on the vehicle lower rear side to an end portion of the inner wall 62B3 on the vehicle upper front side, and the intermediate wall portion 62B2 is formed in a triangular wave shape.

The second frame outer portion 62B is disposed adjacent to a vehicle upper front side of a portion of a side outer panel (also referred to as "side member outer panel") 36 that forms an outer plate portion of the vehicle side portion 18. The front wall 62B1 and the inner wall 62B3 of the second frame outer portion 62B are joined to a portion of the side outer panel 36.

As illustrated in FIGS. 1 and 3, the second inner RF 64 is formed in a substantially V-shaped open cross-sectional shape open toward the vehicle lower rear side and outward in the vehicle-width direction. As illustrated in FIG. 5, the second inner RF 64 includes a front wall 64A that forms a front side of the second inner RF 64, and an outer end portion of the front wall 64A in the vehicle-width direction abuts and is joined to an end portion of the front wall 62B1 of the second frame outer portion 62B on the vehicle upper front side from the inside in the vehicle-width direction. In addition, an interior film 68 is attached to a vehicle upper front side of the front wall 64A.

The second inner RF 64 includes, in the cross-section illustrated in FIG. 5, an inner wall 64B extending from an inner end portion of the front wall 64A in the vehicle-width direction obliquely slightly outward in the vehicle-width direction toward the vehicle lower side. As illustrated in FIG. 1, the inner wall 64B is in a state of being slightly twisted by being gradually changed in its plane direction toward the vehicle lower front side and is disposed to be directed substantially along the vehicle up-down direction and the vehicle front-rear direction at a lower end portion 64B1. As illustrated in FIG. 5, an end portion of the inner wall 64B on the vehicle lower rear side overlaps and is joined to the inner wall 62B3 of the second frame outer portion 62B from the inside in the vehicle-width direction.

In the second frame outer portion 62B and the second inner RF 64, the front wall 62B1 and the front wall 64A are joined to each other and the inner wall 62B3 and the inner wall 64B are joined to each other so as to form a closed cross-section 66 as viewed in a longitudinal direction of the second frame structure portion 60. Between the second frame structure portion 60 and the front side door 44, a weatherstrip 38A is attached to a front end side of the front side door 44 and a weatherstrip 38B is attached to a joint portion between the inner wall 62B3 and the inner wall 64B in the second frame structure portion 60.

As illustrated in FIGS. 1 and 3, the second outer RF 62 includes an upper extension portion 62A extending from the second frame outer portion 62B toward the vehicle upper side and the vehicle rear side. The upper extension portion 62A overlaps the outer panel 24X of the roof side rail 24 illustrated in FIG. 1 from the inside of the vehicle cabin and is joined thereto by welding. In addition, the upper outer flange portion 52F of the first outer RF 52 illustrated in FIG.

Figure 4A:
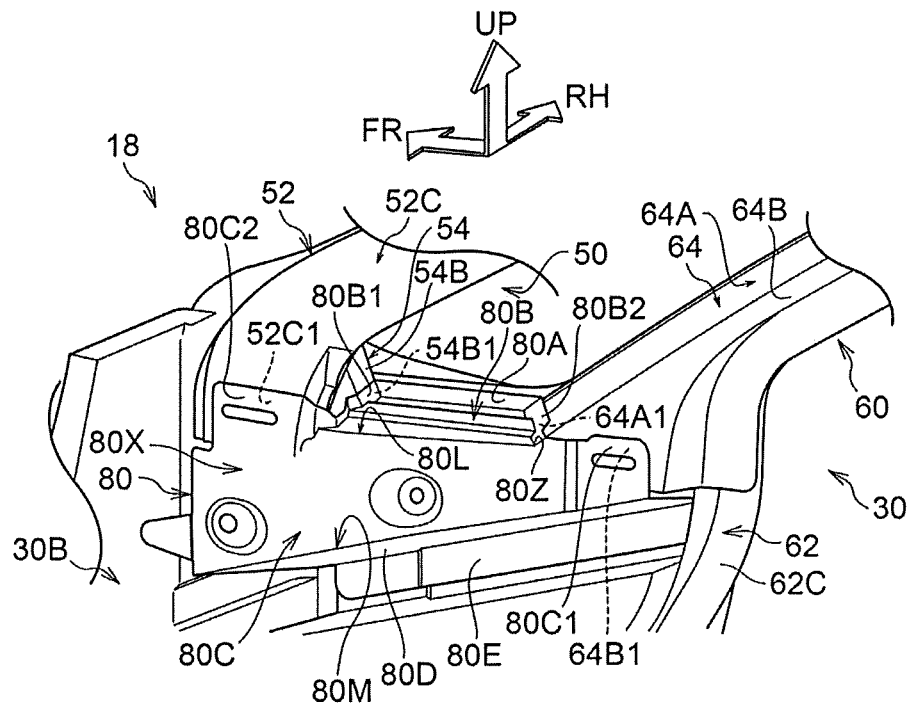
FIG. 4A is an enlarged perspective view of a state in which a lower bulkhead is joined to a first frame structure portion, a second frame structure portion, and the like in FIG. 1.
Figure 4B:
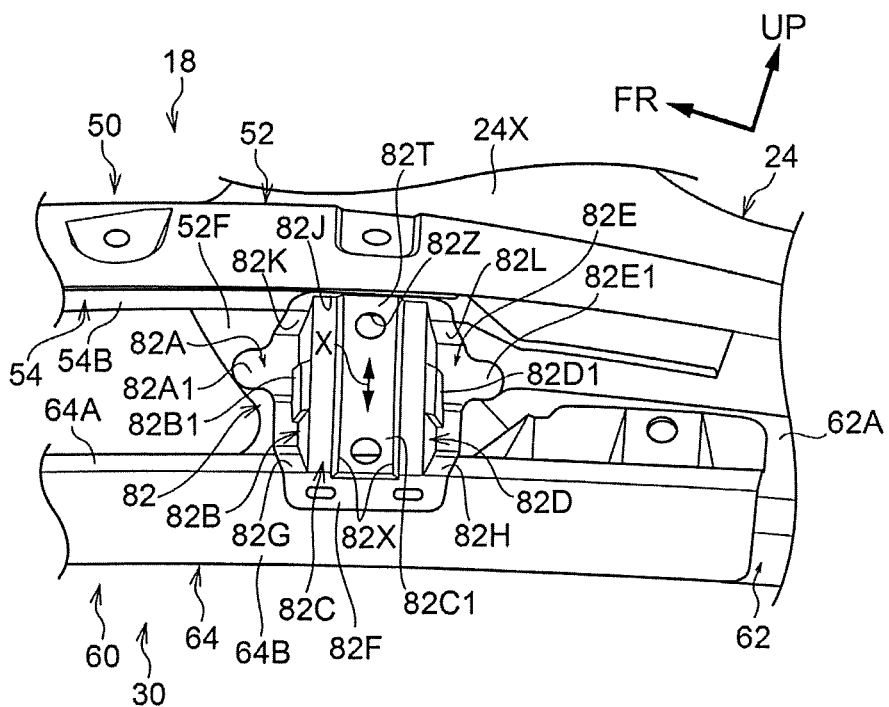
FIG. 4B is an enlarged perspective view of a state in which an upper bulkhead is joined to the first frame structure portion, the second frame structure portion, and the like in FIG. 1.

3 overlaps the upper extension portion 62A from the inside of the vehicle cabin (see FIG. 4B).

As illustrated in FIGS. 1 and 3, the second outer RF 62 includes a lower extension portion 62C extending from the second frame outer portion 62B toward the vehicle lower side and the vehicle front side. As illustrated in FIG. 1, the lower extension portion 62C overlaps an upper portion of the outer panel 30X of the pillar lower portion 30B from the inside of the vehicle cabin and is joined thereto by welding. A lower end portion of the first inner RF 54 (see FIG. 3) overlaps the lower extension portion 62C from the inside of the vehicle cabin.

As illustrated in FIG. 5, in the pillar upper portion 30A, a first transparent member 70 and a second transparent member 72 as transparent members are disposed. The first transparent member 70 and the second transparent member 72 are formed of a transparent material such as inorganic glass or a high strength transparent resin in a plate shape. Examples of the high strength transparent resin include polycarbonate (PC-GF) reinforced with glass fiber and polycarbonate (PC-CNF) reinforced with cellulose nano-fiber. The first transparent member 70 and the second transparent member 72 are bridged between the first frame structure portion 50 and the second frame structure portion 60 that are adjacent to each other, and extend along the longitudinal direction of the pillar upper portion 30A.

Specifically, both end portions of the first transparent member 70 in a direction perpendicular to the longitudinal direction of the pillar upper portion 30A are disposed outward of the first frame structure portion 50 and the second frame structure portion 60 and form a design surface of a vehicle outer side of the pillar upper portion 30A. A first non-transparent member 74 is formed integrally with an inner end portion of the first transparent member 70 in the vehicle-width direction by two-color molding inside the vehicle cabin and inside in the vehicle-width direction. The first non-transparent member 74 is joined to the front wall 52A of the first frame structure portion 50 via an adhesive layer A2. A molding B2 is joined to the first non-transparent member 74, and a tip of the molding B2 is in contact with the side edge portion 28A of the windshield 28. A second non-transparent member 75 is formed integrally with an end portion of the first transparent member 70 on the vehicle lower rear side by two-color molding inside the vehicle cabin and on the vehicle lower rear side. The second non-transparent member 75 is joined to the side outer panel 36 overlapping an outer portion of the front wall 62B1 of the second frame structure portion 60 in the vehicle-width direction via an adhesive layer A3.

Furthermore, both end portions of the second transparent member 72 in a direction perpendicular to the longitudinal direction of the pillar upper portion 30A are disposed inward of the first frame structure portion 50 and the second frame structure portion 60 in the vehicle cabin and form a design surface of a vehicle cabin inner side of the pillar upper portion 30A. An inner end portion of the second transparent member 72 in the vehicle-width direction is joined to an inner portion of the intermediate wall portion 54B of the first frame structure portion 50 in the vehicle-width direction via an adhesive layer A4. An end portion of the second transparent member 72 on the vehicle lower rear side is joined to a portion of the inner wall 64B of the second frame structure portion 60 on the vehicle upper front side via an adhesive layer A5.

A first pillar garnish 76 is attached to the first frame structure portion 50 with a clip 76A, and the first pillar garnish 76 is disposed so as to cover the first frame structure portion 50 from the inside of the vehicle cabin. In a space between the first pillar garnish 76 and the first frame structure portion 50, a long material such as a wire harness and an antenna (not illustrated) is disposed. A second pillar garnish 78 is attached to the second frame structure portion 60 by attaching means (not illustrated), and the second pillar garnish 78 is disposed to cover the second frame structure portion 60 from the inside of the vehicle cabin. In a space between the second pillar garnish 78 and the second frame structure portion 60, a curtain airbag (not illustrated) and the like are disposed.

On the other hand, as illustrated in FIG. 1, a lower portion of the first frame structure portion 50 and a lower portion of the second frame structure portion 60 that are adjacent to each other, are connected by a lower bulkhead 80 as a lower connection member. An upper portion of the first frame structure portion 50 and an upper portion of the second frame structure portion 60 that are adjacent to each other, are connected by an upper bulkhead 82 as an upper connection member. A frame-like structure part 90 is formed by the lower bulkhead 80, the upper bulkhead 82, the first frame structure portion 50, and the second frame structure portion 60. In addition, the lower bulkhead 80 and the upper bulkhead 82 are formed separately from members constituting the first frame structure portion 50 and the second frame structure portion 60, and are formed separately from the pillar lower portion 30B, the roof side rail 24, the first transparent member 70, and the second transparent member 72. Both the lower bulkhead 80 and the upper bulkhead 82 are bent plates made of metal.

FIG. 4A illustrates an enlarged perspective view of a state in which the first frame structure portion 50, the second frame structure portion 60, and the like are joined to the lower bulkhead 80. As illustrated in FIGS. 1 and 4A, the lower bulkhead 80 is configured to include portions attached to the lower end portions of the first frame structure portion 50 and the second frame structure portion 60 and disposed on the vehicle lower side of each of the first frame structure portion 50 and the second frame structure portion 60. In addition, the lower bulkhead 80 is disposed at a position overlapping the outer panel 30X of the pillar lower portion 30B illustrated in FIG. 1 as viewed from the inside of the vehicle cabin.

As illustrated in FIGS. 3 and 4A, the lower bulkhead 80 extends along the vehicle front-rear direction and an intermediate portion of the lower bulkhead 80 in the vehicle front-rear direction is formed in a substantially hat shape having an opening toward the outside in the vehicle-width direction in its longitudinal cross-sectional view. As illustrated in FIG. 4A, in the lower bulkhead 80, an upper flange portion 80A and a lower flange portion 80E forming an outer portion of the lower bulkhead 80 in the vehicle-width direction are joined to the lower extension portion 62C of the second outer RF 62 by welding. In addition, the lower bulkhead 80 includes an inner vertical wall portion 80C that forms an inner portion of the lower bulkhead 80 in the vehicle-width direction and extends along the vehicle up-down direction and the vehicle front-rear direction. The inner vertical wall portion 80C is integrally connected to the upper flange portion 80A by an upper connection portion 80B, and is integrally connected to the lower flange portion 80E by a lower connection portion 80D.

An upper rear portion 80C1 of the inner vertical wall portion 80C is joined to the lower end portion 64B1 of the inner wall 64B of the second inner RF 64 by welding. An upper front portion 80C2 of the inner vertical wall portion 80C of the lower bulkhead 80 is joined to a lower end portion 52C1 of the inner wall 52C of the first outer RF 52 by welding. A front end portion of the upper connection portion 80B is provided with a front flange portion 80B1 that is bent toward the vehicle upper side and extends. The front flange portion 80B1 is joined to a lower rear end portion 54B1 of the intermediate wall portion 54B of the first inner RF 54 by welding. A rear end portion of the upper connection portion 80B is provided with a rear flange portion 80B2 that is bent toward the vehicle lower side obliquely outward in the vehicle-width direction and extends. The rear flange portion 80B2 is joined to a lower end portion 64A1 of the front wall 64A of the second inner RF 64 by welding.

As illustrated in FIG. 1, the lower bulkhead 80 includes a load transmission portion 80X that is located on the vehicle front side of the beltline RF 46 in a state in which the front side door 44 (see FIG. 2) is closed and can transmit a load F from the vehicle front side to the front end portion 46A side of the beltline RF 46. In the load transmission portion 80X, an upper ridgeline 80L as a second ridgeline extending along the vehicle front-rear direction is formed. As illustrated in FIG. 4A, the upper ridgeline 80L serves as a boundary between the inner vertical wall portion 80C and the upper connection portion 80B. In addition, as illustrated in FIG. 1, a rear end portion 80Z of the upper ridgeline 80L is set at a position where the load F from the vehicle front side in the state in which the front side door 44 (see FIG. 2) is closed can be transmitted to a front end portion 46X side of the upper ridgeline 46L of the beltline RF 46. That is, the rear end portion 80Z of the upper ridgeline 80L is set at a position corresponding to the vehicle front side of the front end portion 46X of the upper ridgeline 46L of the beltline RF 46 in the state in which the front side door 44 (see FIG. 2) is closed (a position equivalent to a position of the front end portion 46X of the upper ridgeline 46L in the vehicle up-down direction and in the vehicle-width direction). As illustrated in FIG. 4A, in the load transmission portion 80X, a lower ridgeline 80M serving as a boundary between the inner vertical wall portion 80C and the lower connection portion 80D extends along the vehicle front-rear direction and is inclined slightly toward the vehicle upper side as moving toward the vehicle rear side.

FIG. 4B illustrates an enlarged perspective view of a state in which the first frame structure portion 50, the second frame structure portion 60, and the like are joined to the upper bulkhead 82. In FIG. 4B, a back side perpendicular to FIG. 4B is an obliquely upper rear side outside in the vehicle-width direction. As illustrated in FIGS. 1 and 4B, the upper bulkhead 82 is interposed between the upper end side of the first frame structure portion 50 and the upper end side of the second frame structure portion 60 and extends perpendicular to an extension direction of each of the first frame structure portion 50 and the second frame structure portion 60. The upper bulkhead 82 is disposed at a position overlapping the outer panel 24X of the roof side rail 24 as viewed from the inside of the vehicle cabin.

As illustrated in FIGS. 3 and 4B, a cross-sectional shape of the upper bulkhead 82 cut in the direction along the extension direction of each of the first frame structure portion 50 and the second frame structure portion 60 is formed in a substantially hat shape having an opening toward the outside in the vehicle-width direction. As illustrated in FIG. 4B, the upper bulkhead 82 includes a front flange portion 82A and a rear flange portion 82E constituting an outer portion of the upper bulkhead 82 in the vehicle-width direction. The front flange portion 82A includes a protruding portion 82A1 protruding toward the vehicle lower front side, and the rear flange portion 82E includes a protruding portion 82E1 protruding toward a vehicle upper rear side. The protruding portion 82A1 of the front flange portion 82A and the protruding portion 82E1 of the rear flange portion 82E in the upper bulkhead 82 overlap the upper outer flange portion 52F of the first outer RF 52 and the upper extension portion 62A of the second outer RF 62 and are joined thereto by welding.

The upper bulkhead 82 includes an inner wall portion 82C forming an inner portion of the upper bulkhead 82 in the vehicle-width direction in the substantially hat-shaped portion mentioned above. The inner wall portion 82C is disposed so as to face an obliquely lower rear side inside in the vehicle-width direction as a whole. The inner wall portion 82C includes a reinforcing bead 82C1 that extends along a direction in which the first frame structure portion 50 and the second frame structure portion 60 are connected by the upper bulkhead 82 (hereinafter, referred to as "connection direction X by the upper bulkhead 82") over the entire length of the inner wall portion 82C. The reinforcing bead 82C1 is set at a position at which both end portions of the inner wall portion 82C in a direction perpendicular to the connection direction X by the upper bulkhead 82 are divided, and is configured to include two ridgelines 82X extending in the connection direction X by the upper bulkhead 82. A hole 82Z for welding work penetrates through a top portion 82T of the reinforcing bead 82C1.

The inner wall portion 82C is integrally connected to the front flange portion 82A by a front connection portion 82B, and is integrally connected to the rear flange portion 82E by a rear connection portion 82D. A reinforcing bead 82B1 is formed in an intermediate portion of the front connection portion 82B in the connection direction X by the upper bulkhead 82. The reinforcing bead 82B1 extends along a direction in which the inner wall portion 82C and the front flange portion 82A are connected by the front connection portion 82B over the entire length of the front connection portion 82B. A reinforcing bead 82D1 is formed in an intermediate portion of the rear connection portion 82D in the connection direction X by the upper bulkhead 82. The reinforcing bead 82D1 extends along a direction in which the inner wall portion 82C and the rear flange portion 82E are connected by the rear connection portion 82D over the entire length of the rear connection portion 82D.

A lower flange portion 82F extends from a lower end side of the inner wall portion 82C toward the vehicle lower rear side. The lower flange portion 82F overlaps a portion of an upper end side of the inner wall 64B of the second inner RF 64 from the vehicle cabin side and is joined thereto by welding. The front flange portion 82A, the lower flange portion 82F, and the front connection portion 82B are connected by a lower front flange portion 82G. The lower front flange portion 82G overlaps a portion of an upper end side of the front wall 64A of the second inner RF 64 and is joined thereto by welding. The rear flange portion 82E, the lower flange portion 82F, and the rear connection portion 82D are connected by a lower rear flange portion 82H. The lower rear flange portion 82H overlaps a portion of the upper end side of the front wall 64A of the second inner RF 64 and is joined thereto by welding.

An upper flange portion 82J (see FIG. 3) extends inward in the vehicle-width direction from an upper end side of the inner wall portion 82C. The upper flange portion 82J overlaps a portion of an upper end side of the intermediate wall portion 54B of the first inner RF 54 obliquely from the vehicle lower rear side outside in the vehicle-width direction and is joined thereto by welding. The front flange portion 82A, the upper flange portion 82J, and the front connection portion 82B are connected by an upper front flange portion 82K. A portion of the upper front flange portion 82K overlaps a portion of the upper end side of the intermediate wall portion 54B of the first inner RF 54 obliquely from the vehicle lower rear side outside in the vehicle-width direction and is joined thereto by welding. The rear flange portion 82E, the upper flange portion 82J, and the rear connection portion 82D are connected by an upper rear flange portion 82L. A portion of the upper rear flange portion 82L overlaps a portion of the upper end side of the intermediate wall portion 54B of the first inner RF 54 obliquely from the vehicle lower rear side outside in the vehicle-width direction and is joined thereto by welding.

The first outer RF 52, the first inner RF 54, the second outer RF 62, the second inner RF 64, the lower bulkhead 80, and the upper bulkhead 82 illustrated in FIG. 3 are preferably formed into a sub-assembly by being joined together before being joined to the pillar lower portion 30B or the roof side rail 24 illustrated in FIG. 1. That is, for example, when a procedure is adopted in which the lower bulkhead 80 and the upper bulkhead 82 are joined last without forming the sub-assembly as described above, a case where joining of the lower bulkhead 80 and the upper bulkhead 82 is difficult due to an assembling error or the like is considered. However, such a situation can be avoided by forming the sub-assembly in advance.

In this embodiment, as an example, as illustrated in FIG. 1, a bulkhead 84 is disposed parallel to a vehicle lower side of the lower bulkhead 80. The bulkhead 84 is formed in a substantially hat shape having an opening toward the outside in the vehicle-width direction in its longitudinal sectional view and is joined to the lower extension portion 62C of the second outer RF 62 by welding. In this embodiment, as an example, an upper flange portion of the bulkhead 84 is interposed between the upper flange portion 80A (see FIG. 4A) of the lower bulkhead 80 and the lower extension portion 62C of the second outer RF 62. In a case where the members including the lower bulkhead 80 and the upper bulkhead 82 are formed into the sub-assembly in advance as described above, the bulkhead 84 is also integrated with the lower bulkhead 80 and the like.

The bulkhead 84 is configured to include a portion that is located on the vehicle front side of the beltline RF 46 in the state in which the front side door 44 (see FIG. 2) is closed and can transmit the load F from the vehicle front side to the front end portion 46A side of the beltline RF 46. A lower ridgeline 84L that extends along the vehicle front-rear direction and is inclined slightly toward the vehicle upper side as moving toward the vehicle rear side is formed on the lower side of the bulkhead 84. A rear end portion 84Z of the lower ridgeline 84L is set at a position where the load F from the vehicle front side in the state in which the front side door 44 (see FIG. 2) is closed can be transmitted to a front end portion 46Y side of the lower ridgeline 46M of the beltline RF 46. That is, the rear end portion 84Z of the lower ridgeline 84L is set at a position corresponding to the vehicle front side of the front end portion 46Y of the lower ridgeline 46M of the beltline RF 46 in the state in which the front side door 44 (see FIG. 2) is closed (a position equivalent to a position of the front end portion 46Y of the lower ridgeline 46M in the vehicle up-down direction and in the vehicle-width direction).

Operations and Effects of Embodiment

Next, operations and effects of the embodiment will be described.

As illustrated in FIG. 1, the first frame structure portion 50 and the second frame structure portion 60 are disposed on the front edge side of the upper half of the front door opening 40 as a portion of the columnar front pillar 30 in the vehicle side portion 18, and are provided in parallel with an interval therebetween in the direction perpendicular to the longitudinal direction of the pillar upper portion 30A (the upper portion of the front pillar 30) as viewed from the inside of the vehicle cabin. The first frame structure portion 50 and the second frame structure portion 60 are formed as separate members and thus are more easily made compared to, for example, a comparable structure in which the first frame structure portion 50 and the second frame structure portion 60 are formed of the same member. In addition, as illustrated in FIG. 5, since the first transparent member 70 and the second transparent member 72 are bridged between the first frame structure portion 50 and the second frame structure portion 60 that are adjacent to each other, an occupant inside the vehicle cabin can see the outside of the vehicle from between the first frame structure portion 50 and the second frame structure portion 60.

In addition, since the first frame structure portion 50 and the second frame structure portion 60 are each formed in a hollow columnar shape and each have a closed cross-sectional structure as viewed in the longitudinal direction, a certain degree of rigidity is secured for each of the first frame structure portion 50 and the second frame structure portion 60. Here, as illustrated in FIG. 1, the first frame structure portion 50 and the second frame structure portion 60 that are adjacent to each other, are connected by the lower bulkhead 80 and the upper bulkhead 82 that are formed separately from the members constituting the first frame structure portion 50 and the second frame structure portion 60, the pillar lower portion 30B, the roof side rail 24, the first transparent member 70, and the second transparent member 72 (see FIG. 5). Accordingly, for example, when an external load is applied to the front pillar 30, such as during a frontal collision and rollover, the relative movement between the first frame structure portion 50 and the second frame structure portion 60 is suppressed, and the first frame structure portion 50 and the second frame structure portion 60 receive the load as an integrated frame portion.

In addition, in this embodiment, the lower portion of the first frame structure portion 50 and the lower portion of the second frame structure portion 60 that are adjacent to each other, are connected by the lower bulkhead 80, and the upper portion of the first frame structure portion 50 and the upper portion of the second frame structure portion 60 that are adjacent to each other, are connected by the upper bulkhead 82. In addition, since the frame-like structure part 90 is formed by the lower bulkhead 80, the upper bulkhead 82, the first frame structure portion 50, and the second frame structure portion 60, when an external load is applied, relative movement between the first frame structure portion 50 and the second frame structure portion 60 is effectively suppressed.

In this embodiment, the lower bulkhead 80 is disposed at a position overlapping the outer panel 30X of the pillar lower portion 30B as viewed from the inside of the vehicle cabin, and the upper bulkhead 82 is disposed at a position overlapping the outer panel 24X of the roof side rail 24 as viewed from the inside of the vehicle cabin. Therefore, it is possible to secure visibility equivalent to visibility from the inside of the vehicle cabin in a case where the lower bulkhead 80 and the upper bulkhead 82 are not provided.

In this embodiment, the load F from the vehicle front side at the time of a frontal collision is transmitted to the first frame structure portion 50 (see the arrow f1) and is transmitted from the first frame structure portion 50 to the second frame structure portion 60 via the lower bulkhead 80 (see the arrow f2). In addition, the load transmission portion 80X of the lower bulkhead 80 is located on the vehicle front side of the beltline RF 46 in the state in which the front side door 44 (see FIG. 2) is closed, and a portion of the load F from the vehicle front side at the time of a frontal collision is transmitted from the load transmission portion 80X of the lower bulkhead 80 to the front end portion 46A side of the beltline RF 46. As described above, since the load transmission portion 80X of the lower bulkhead 80 functions as a path (load path) for transmitting the load F to the beltline RF 46, it is possible to improve collision safety performance at the time of a frontal collision while suppressing the number of components.

In addition, in this embodiment, the upper ridgeline 46L of the beltline RF 46 extends along the vehicle front-rear direction in the state in which the front side door 44 (see FIG. 2) is closed, and the upper ridgeline 80L formed in the load transmission portion 80X of the lower bulkhead 80 also extends along the vehicle front-rear direction. Here, the rear end portion 80Z of the upper ridgeline 80L is set at the position where the load F from the vehicle front side in the state in which the front side door 44 (see FIG. 2) is closed can be transmitted to the front end portion 46X side of the upper ridgeline 46L of the beltline RF 46. Therefore, a portion of the load F applied to the lower bulkhead 80 from the vehicle front side at the time of a frontal collision is transmitted along the upper ridgeline 80L of the load transmission portion 80X and is thereafter efficiently transmitted along the upper ridgeline 46L of the beltline RF 46 (see the arrow f3). Furthermore, in this embodiment, the rear end portion 84Z of the lower ridgeline 84L of the bulkhead 84 is set at the position where the load F from the vehicle front side in the state in which the front side door 44 (see FIG. 2) is closed can be transmitted to the front end portion 46Y side of the lower ridgeline 46M of the beltline RF 46. Therefore, a portion of the load F applied to the bulkhead 84 from the vehicle front side at the time of a frontal collision is transmitted along the lower ridgeline 84L and is thereafter efficiently transmitted along the lower ridgeline 46M of the beltline RF 46.

As described above, with the vehicle pillar structure and the vehicle side portion structure according to this embodiment, even when the first frame structure portion 50 and the second frame structure portion 60 are reduced in thickness, the rigidity of the front pillar 30 can be secured. As a result, a Kt value, which is a value representing the torsional rigidity of the vehicle body, is secured, whereby it is possible to improve a forward view while handling stability and ride quality are maintained.

In addition, in this embodiment, since the first frame structure portion 50 and the second frame structure portion 60 are configured to be integrated by the lower bulkhead 80 and the upper bulkhead 82, for example, buckling and breakage of one of the first frame structure portion 50 and the second frame structure portion 60 at the time of a collision can be prevented or suppressed. That is, for example, when a load is applied to one of the first frame structure portion 50 and the second frame structure portion 60, the other of the first frame structure portion 50 and the second frame structure portion 60 can receive the load satisfactorily, so that the strength of the front pillar 30 at the time of a collision can be secured satisfactorily. As a result, good collision safety performance is secured.

Furthermore, in this embodiment, since the first frame structure portion 50 and the second frame structure portion 60 are reduced in thickness, which can contribute to a reduction in weight. As a result, it is possible to improve the fuel efficiency of the vehicle, and it is possible to improve responsiveness when a steering wheel is turned at the time of corner driving.

Supplementary Description of Embodiment

In the embodiment, the vehicle pillar structure (a structure including the first frame structure portion 50, the second frame structure portion 60, the lower bulkhead 80, the upper bulkhead 82, and the like) of the disclosure is applied to the front pillar 30. However, for example, the vehicle pillar structure of the disclosure may also be applied to a pillar other than the front pillar 30, such as the rear pillar 34 illustrated in FIG. 2. In addition, in the embodiment, the vehicle pillar structure of the disclosure is applied to a pair of the right and left front pillars 30. However, for example, the vehicle pillar structure of the disclosure may also be applied only to the front pillar 30 on a driver's seat side.

In the embodiment, two frame portions including the first frame structure portion 50 and the second frame structure portion 60 illustrated in FIG. 1 are set as the pillar frame structure portions. However, a plurality of pillar frame structure portions, for example, three or more pillar frame structure portions may be set.

In the embodiment, the first frame structure portion 50 and the second frame structure portion 60 are joined to the lower bulkhead 80 and the upper bulkhead 82 by welding, but may also be joined by mechanical fastening using bolts, rivets, and the like instead of the welding.

In the embodiment, the lower bulkhead 80 and the upper bulkhead 82 are included preferably. However, one of the lower bulkhead 80 and the upper bulkhead 82 may be included.

In addition, as a modification example of the embodiment, a connection member may be disposed at a position that does not overlap a frame member of the vehicle side portion as viewed from the inside of the vehicle cabin (as an example, in an intermediate portion of a pillar window portion in its longitudinal direction).

As a modification example of the embodiment, the lower bulkhead 80 may not include a portion positioned on the vehicle front side of the beltline RF 46 in the state in which the front side door 44 is closed.

As a modification example of the embodiment, a lower bulkhead as a lower connection member may be formed by forming the upper ridgeline 80L of the lower bulkhead 80 into a shape extending over the entire length of the lower bulkhead 80 in the vehicle front-rear direction. In addition, as another modification example of the embodiment, a lower bulkhead as a lower connection member may be formed by integrally forming a portion corresponding to the lower bulkhead 80 and a portion corresponding to the bulkhead 84 with each other. Furthermore, as another modification example of the embodiment, a ridgeline that functions as the upper ridgeline 80L may not be formed in the load transmission portion 80X of the lower bulkhead 80.

The embodiment and the modification examples described above can be appropriately combined to be implemented.

While the examples of the disclosure have been described above, the disclosure is not limited thereto, and it is natural that various other modifications can be made without departing from the gist thereof.

What is claimed is:

1. A vehicle pillar structure comprising:
a plurality of pillar frame structure portions, the pillar frame structure portions being disposed on an edge side of an upper half of a door opening as a portion of a columnar pillar in a vehicle side portion, being provided in parallel with an interval between the pillar frame structure portions in a direction perpendicular to a longitudinal direction of the pillar as viewed from an inside of a vehicle cabin, being configured as separate members, being formed in a hollow columnar shape, and having upper and lower end portions fixed to a frame member of the vehicle side portion;
a transparent member that is formed of a transparent material and is bridged between the pillar frame structure portions that are adjacent to each other;
a connection member that is formed separately from members constituting the pillar frame structure portions, the frame member, and the transparent member;
a first ridgeline extending along a vehicle front-rear direction in a state in which a front side door is closed is formed in a beltline reinforcement; and
a second ridgeline extending along the vehicle front-rear direction is formed in a load transmission portion, and a rear end portion of the second ridgeline is set at a position where a load from a vehicle front side in the state in which the front side door is closed is transmitted to a front end portion side of the first ridgeline,
wherein the connection member connects the pillar frame structure portions that are adjacent to each other and that are aligned in a vehicle front-rear direction.

2. The vehicle pillar structure according to claim 1, wherein:
the connection member includes a lower connection member that connects lower portions of the pillar frame structure portions that are adjacent to each other, and an the upper connection member that connects upper portions of the pillar frame structure portions that are adjacent to each other, and
wherein a frame-like structure part includes the lower connection member, the upper connection member, and the pillar frame structure portions.

3. The vehicle pillar structure according to claim 1, wherein the connection member includes a lower connection member and an upper connection member, and
wherein the lower connection member is disposed at a position overlapping the frame member as viewed from the inside of the vehicle cabin.

4. A vehicle side portion structure comprising:
a front pillar having a plurality of pillar frame structure portions, the pillar frame structure portions being disposed on an edge side of an upper half of a door opening as a portion of a columnar pillar in a vehicle side portion, being provided in parallel with an interval between the pillar frame structure portions in a direction perpendicular to a longitudinal direction of the pillar as viewed from an inside of a vehicle cabin, being configured as separate members, being formed in a hollow columnar shape, and having upper and lower end portions fixed to a frame member of the vehicle side portion; a transparent member that is formed of a transparent material and is bridged between the pillar frame structure portions that are adjacent to each other and a connection member that is formed separately from members constituting the pillar frame structure portions, the frame member, and the transparent member, wherein the connection member connects the pillar frame structure portions that are adjacent to each other and that are aligned in a vehicle front-rear direction;
a front side door that opens and closes a front door opening as the door opening having the front pillar disposed on the edge side of the door opening;
a beltline reinforcement that is provided in the front side door and is disposed along a beltline;
a first ridgeline extending along the vehicle front-rear direction in the state in which the front side door is closed is formed in the beltline reinforcement; and
a second ridgeline extending along the vehicle front-rear direction is formed in the load transmission portion, and a rear end portion of the second ridgeline is set at a position where a load from the vehicle front side in the state in which the front side door is closed is transmitted to a front end portion side of the first ridgeline,
wherein the connection member includes a lower connection member that connects lower portions of the pillar frame structure portions that are adjacent to each other, and the lower connection member includes a load transmission portion that is located on a vehicle front side of the beltline reinforcement in a state in which the front side door is closed and is configured to transmit a load from the vehicle front side to a front end portion side of the beltline reinforcement.

5. The vehicle side portion structure according to claim 1, wherein the connection member extends in the vehicle front-rear direction.

6. The vehicle pillar structure according to claim 4, wherein
the connection member includes an upper connection member that connects upper portions of the pillar frame structure portions that are adjacent to each other, and
wherein a frame-like structure part includes the lower connection member, the upper connection member, and the pillar frame structure portions.

7. The vehicle pillar structure according to claim 4, wherein the connection member includes an upper connection member, and
wherein the lower connection member is disposed at a position overlapping the frame member as viewed from the inside of the vehicle cabin.

8. The vehicle side portion structure according to claim 4, wherein the connection member extends in the vehicle front-rear direction.

* * * * *